United States Patent Office 3,192,189
Patented June 29, 1965

3,192,189
METHOD FOR RECOVERING MONOMERIC MATERIALS BY A STRIPPING OPERATION IN THE PRESENCE OF A CHLOROXY SALT
Akira Nakajima and Yuji Kajitani, Saidaiji, Japan, assignors to American Cyanamid Company, Stamford, Conn., a corporation of Maine
No Drawing. Filed Sept. 11, 1962, Ser. No. 222,938
Claims priority, application Japan, Sept. 21, 1961, 36/34,178
6 Claims. (Cl. 260—88.7)

The present invention relates to an improvement in the method for recovering unreacted monomers by way of stripping from the product of polymerization containing monomers including acrylonitrile.

Where a homopolymer of acrylonitrile or a copolymer of acrylonitrile and unsaturated monomer copolymerizable therewith is manufactured, it is usual that some of the monomer or monomers remain unreacted in the resulting polymer product. From the standpoint of economy, it is obviously desirable to recover such unreacted monomers and put them to reuse.

The recovery of unreacted acrylonitrile either alone or in conjunction with other monomers from the polymerization product is effected by stripping, that is, recovering the monomers through distillation of same by permitting the polymer slurry to contact steam. Such stripping operation is usually carried out in a stripping tower equipped with suitable baffles, filler means, etc. However, this type of operation has some disadvantages, e.g., monomers tend to undergo further polymerization in the course of stripping and this secondary formation of polymer in turn tends not only to discolor the main polymer product but often to clog the piping of said stripping apparatus and/or reduce the efficiency of stripping.

The present invention is concerned with a process for recovering monomers including acrylonitrile from a polymer product, characterized in that the aforementioned troubles are eliminated by a stripping operation in which a small quantity of a chloroxy salt is added to the polymer slurry.

Thus, the addition of a small quantity of a chloroxy salt to a polymer slurry tends to completely inhibit further polymerization of unreacted monomers while the slurry is stripped, so that the secondary formation of polymer which would cause discoloration of the final product may successfully be prevented. Furthermore, it can be expected that the addition of a salt of a chloroxy acid will eliminate the tendency of the polymer to be soiled or discolored in the course of polymerization reaction due to certain factors, such as a trace amount of impurities contained in the monomers or the metallic ions originating from a slight corrosion of the polymerization vessel. This seems to result from the decomposition of the chloroxy salt giving rise to oxygen and/or chlorine, which not only eliminates those radicals which could induce a secondary polymerization reaction but also bleaches the colored matter contained in the polymer product, although the mechanism thereof has not as yet been fully ascertained. When use is made of some other known polymerization inhibitors, e.g., hydroquinone, tertiary butyl-catechol, nitrobenzene, caustic alkali, carbonates, aqueous ammonia, etc., the polymerization inhibitors themselves become each a cause for discoloration, so that no beneficial result can be expected in contrast to the favorable effect attainable when use is made of a chloroxy salt according to the invention.

Salts of chloroxy acids which can be employed in the method of the present invention include salts of, for example, perchloric acid, hypochloric acid, and the like. The quantity of such a salt to be added depends on its type, but, generally speaking, it would be sufficient to add from 0.001 to 0.02 mole of the salt per mole of the unreacted monomer present in the particular polymer slurry. Also, if desired, mixtures of such salts may be used. The present invention may be applicable when unreacted monomers are to be recovered from polymerization product obtained from acrylonitrile alone or acrylonitrile and one or more co-polymerizable unsaturated monomers.

The following examples are given for illustrative purposes only, and should by no means be construed as limiting the present invention.

REFERENCE EXAMPLE

An aqueous polymer slurry was prepared by co-polymerizing 90 parts of acrylonitrile with 10 parts of methacrylate monomer in a nitric acidic aqueous solution using a redox catalyst of a chlorate-sulfite (said slurry contained 12 parts or polymer and 5 parts of unreacted monomers). To samples of sad slurry were each added various polymerization inhibitors, and the mixtures were left standing for about 120 minutes in a thermostatic vessel at 60° C. Portions of the samples were filtered before and after the above standing period, and the relative efficiency of said inhibitors was determined by measuring the polymer solid weight. As a control, a sample of the slurry to which no inhibitor had been added was also tested in the same manner. Table 1 shows the results in percent polymer solid. In the same table, increase in percent polymer solid represents incomplete inhibition of polymerization.

Table 1

| No. | Inhibitor | Inhibitor per mole of unreacted monomers (mole) | Percent polymer solid in slurry | | Condition of slurry (coloration, etc.) |
|---|---|---|---|---|---|
| | | | Before addition of inhibitor | After standing | |
| 1 | Control | | 12.20 | 14.00 | |
| 2 | Sodium hypochlorite | 0.005 | 12.20 | 12.22 | |
| 3 | Sodium chlorite | 0.002 | 12.20 | 12.20 | |
| 4 | Sodium chlorate | 0.005 | 12.21 | 12.27 | |
| 5 | Sodium perchlorate | 0.01 | 12.21 | 12.38 | |
| 6 | Picric acid | 0.01 | 12.20 | 12.63 | Colored. |
| 7 | Nitrobenzene | 0.01 | 12.20 | 12.85 | Do. |
| 8 | Aqueous ammonia | (pH 7.0) | 12.25 | 12.30 | Slightly colored. |
| 9 | tert.-Butyl-catechol | 0.01 | 12.20 | 12.25 | Colored under alkaline conditions. |
| 10 | Hydroquinone | 0.01 | 12.20 | 12.22 | Colored under alkaline conditions. |
| 11 | Sodium bicarbonate | (pH 7.0) | 12.25 | 12.50 | Colored. |

EXAMPLE 1

A polymer slurry was prepared by co-polymerizing 90 parts of acrylonitrile monomer with 10 parts of methacrylate monomer in a nitric acidic aqueous solution using a chlorate-sulfite redox catalyst. To 10,000-grams samples of said slurry (i.e., each sample contained 1200 grams of polymer solid and 500 grams of unreacted monomers) were each added 1.0 gram of sodium hypochlorite, 0.5 gram of sodium chlorite, or 2.0 grams of sodium perchlorate, each addition being made after the salt was dissolved in 500 cc. of water. After the salt and slurry was thoroughly mixed up, the mixture or slurry was distilled in a vacuum of 70–80 mm. Hg at 50° C. for about 20 minutes to remove unreacted monomers. The slurry discharged from the distillator was accurately weighed and dehydrated using a centrifugal dehydrator. The resulting polymer was thoroughly washed with water at room temperature. The polymer was subjected to a polymer discoloration test to determine the degree of discoloration.

To evaluate the inhibitory action of various salts, the polymer solid contents of the slurry were determined before and after distillation, and the amount of polymer calculated from the results obtained. If the amount of polymer had not been increased, it was assumed that the salt had inhibitory action.

For control purposes, similar tests were further conducted with a sample to which had been added no inhibitor and also with samples to which, respectively, had been added, as in the foregoing example, pyrogallol, hydroquinone, aqueous ammonia, benzene, nitrobenzene, sodium carbonate, and caustic soda, followed, in either case, by stripping the slurry prepared thereby in the same manner as described hereinbefore and dehydrating and washing the polymer thus obtained before it is subjected to the test.

The results are given in Table 2.

EXAMPLE 2

A slurry was prepared by co-polymerizing 95 parts of acrylonitrile monomer with 5 parts of methacrylate monomer in a nitric acidic aqueous solution using a chlorate-sulfite redox catalyst. To 10,000-gram samples of the slurry were respectively added the polymerization inhibitors of the invention in varying amounts, i.e., from 0.5 g. to 5.0 g. in the same manner as in Example 1.

The samples were stripped for about 20 minutes at 50° C. in a vacuum of 70–80 mm. Hg to remove unreacted monomers.

The slurries were then filtered and washed with water. The resulting polymers were finally evaluated for inhibitory effect and measured for the degree of polymer discoloration.

Controls were prepared in the same manner as in Example 1, using pyrogallol, hydroquinone, nitrobenzene, and aqueous ammonia, as well as the sample to which no inhibitor had been added.

The results are summarized in Table 3.

*Table 3*

| Experiment No. | Polymerization inhibitor | Level of addition (based on slurry) | Amount of polymer (g.) Before distillation | Amount of polymer (g.) After distillation | Degree of polymer discoloration APHA No. | Degree of polymer discoloration Light absorbency at 270 m$\mu$ |
|---|---|---|---|---|---|---|
| 1 | (No inhibitor) | | 1,210 | 1,350 | 30 | 0.11 |
| 2 | Sodium hypochlorite | 1.0 | 1,205 | 1,220 | 23 | 0.06 |
| 3 | Sodium chlorite | 0.5 | 1,200 | 1,203 | 15 | 0.02 |
| 4 | Sodium chlorate | 2.0 | 1,250 | 1,208 | 21 | 0.05 |
| 5 | Sodium perchlorate | 7.0 | 1,230 | 1,300 | 23 | 0.06 |
| 6 | Pyrogallol | 0.5 | 1,200 | 1,350 | 35 | 0.20 |
| 7 | Hydroquinone | 0.5 | 1,220 | 1,280 | 30 | 0.11 |
| 8 | Nitrobenzene | 2.0 | 1,210 | 1,340 | 45 | 0.26 |
| 9 | Aqueous ammonia | (pH 7) | 1,250 | 1,260 | 42 | 0.26 |

We claim:
1. In a method of recovering monomeric material comprising acrylonitrile by a stripping operation from a polymer slurry containing said monomeric material, the improvement comprising adding to the polymer slurry at least one alkali metal salt of a chloroxy acid and stripping said monomeric material from said slurry.

2. A method as defined in claim 1 wherein said alkali metal salt of a chloroxy acid is hypochlorite.

3. A method as defined in claim 1 wherein said alkali metal salt of a chloroxy acid is a chlorite.

4. A method as defined in claim 1 wherein said alkali metal salt of a chloroxy acid is a chlorate.

*Table 2*

| Experiment No. | Polymerization inhibitor | Level of addition in grams per 10,000 grams slurry | Amount of polymer (g.) Before distillation | Amount of polymer (g.) After distillation | Degree of polymer discoloration APHA No. | Degree of polymer discoloration Light absorbency at 270 m$\mu$ |
|---|---|---|---|---|---|---|
| 1 | (No inhibitor) | 0 | 1,200 | 1,380 | 28 | 0.10 |
| 2 | Sodium hypochlorite | 1.0 | 1,210 | 1,230 | 20 | 0.05 |
| 3 | Sodium chlorite | 0.5 | 1,200 | 1,205 | 15 | 0.02 |
| 4 | Sodium chlorate | 2.0 | 1,200 | 1,220 | 20 | 0.04 |
| 5 | Sodium perchlorate | 7.0 | 1,210 | 1,250 | 20 | 0.04 |
| 6 | Pyrogallol | 0.5 | 1,220 | 1,300 | 32 | 0.19 |
| 7 | Hydroquinone | 0.5 | 1,210 | 1,250 | 27 | 0.10 |
| 8 | Aqueous ammonia | (pH 7) | 1,200 | 1,210 | 35 | 0.20 |
| 9 | Sodium bicarbonate | (pH 7) | 1,210 | 1,280 | 35 | 0.22 |
| 10 | Nitrobenzene | 2.0 | 1,220 | 1,300 | 40 | 0.25 |
| 11 | Pyrogallol | 2.0 | 1,200 | 1,300 | 40 | 0.30 |
| 12 | Caustic soda | (pH 7) | 1,200 | 1,250 | 32 | 0.19 |

NOTE.—The degree of polymer discoloration was determined in the following manner APHA numbers were determined from the APHA number standard curve after the light absorbency of the solution of 2.5 grams of each polymer sample in 50 cc. of r-butylolactone was measured at 430 m$\mu$ by electrophotometer. The light absorbency indices at 270 m$\mu$ represent the values obtained on apectrophotometer for the solution of 4.0 grams of each polymer in 1000 cc. of ethylene carbonate. The light absorbency indices at 270 m$\mu$ refer to the amount of groups and the lower the value, the higher the degree of whiteness.

5. A method as defined in claim 1 wherein said alkali metal salt of a chloroxy acid is a perchlorate.

6. A method as defined in claim 1 wherein about 0.001 to 0.02 mole of said alkali metal salt of a chloroxy acid is added per mole of monomer present in said polymer slurry.

References Cited by the Examiner

UNITED STATES PATENTS

| 2,362,052 | 11/44 | Craig | 202—46 |
| 2,433,060 | 12/47 | Ohsol et al. | 202—46 |
| 2,462,013 | 2/49 | Waterman | 202—46 |
| 2,870,065 | 1/59 | Mitchell | 202—46 |
| 2,963,938 | 12/60 | Miller | 260—85.5 |

OTHER REFERENCES

Yamazaki et al., Chem. Abs., 52, page 5027$b$ (1958).

Nagao et al., Chem. Abs., 53, page 6691$e$ (1959).

JOSEPH L. SCHOFER, *Primary Examiner.*

DONALD E. CZAJA, *Examiner.*